Sept. 16, 1969     G. W. PROBST ET AL     3,467,750
ANTHELVENCIN AND PROCESS FOR THE PRODUCTION THEREOF
Filed March 12, 1964     2 Sheets-Sheet 1

INVENTORS
GERALD W. PROBST
MARVIN M. HOEHN, JAMES M. McGUIRE
BY

ATTORNEY

United States Patent Office 3,467,750
Patented Sept. 16, 1969

3,467,750
ANTHELVENCIN AND PROCESS FOR THE PRODUCTION THEREOF
Gerald W. Probst, Marvin M. Hoehn, and James M. McGuire, Indianapolis, Ind., assignors to Eli Lilly and Company, Indianapolis, Ind., a corporation of Indiana
Filed Mar. 12, 1964, Ser. No. 351,409
Int. Cl. A61k 21/00; C12d 9/14; C07g 11/00
U.S. Cl. 424—118                        9 Claims

ABSTRACT OF THE DISCLOSURE

Anthelvencin, an antibiotic produced by the culture of suitable strains of *Streptomyces venezuelae* and having anthelmintic properties.

---

This invention relates to a novel antibiotic agent and to a process for the production thereof. More particularly this invention relates to an antibiotic compound denominated herein by the arbitrary name anthelvencin.

Anthelvencin is a basic nitrogenous compound produced by cultivating under controlled conditions certain heretofore undescribed strains of the actinomycete *Streptomyces venezuelae*. As the free base, anthelvencin is relatively unstable; consequently, it is preferably employed as and characterized by means of its addition salts with organic or inorganic acids. Especially suitable for purposes of characterization are its salts with 2-naphthalenesulfonic acid and salicylic acid.

The 2-naphthalenesulfonate salt of anthelvencin is a white crystalline solid melting at about 181–183° C., soluble in hot water, methanol, benzyl alcohol, dimethylformamide, dimethyl sulfoxide, phenol, methyl Cellosolve, and aqueous solvent mixtures such as aqueous acetone, aqueous alcohol, and the like. It is only slightly soluble in ethanol, and relatively insoluble in solvents such as cold water, isopropanol, acetone, ethyl acetate, ether, chloroform, benzene, and the like.

Electrometric titration of anthelvencin 2-naphthalenesulfonate in 66 percent aqueous dimethylformamide indicates the presence of two titratable groups having pK'a values of 9.58 and 11.95. The apparent molecular weight as determined from the titration curve is about 847.

An average of several microanalyses of anthelvencin 2-naphthalenesulfonate indicates the following approximate percentage composition: C, 54.78%; H, 5.23%; N, 14.66%; O, 17.38%; S, 7.41%. The empirical formula of the salt which best fits these data is $C_{39}H_{44}N_9O_9S_2$, from which the empirical formula of the free base of anthelvencin is calculated to be $C_{19}H_{28}N_9O_3$.

Figure 1:
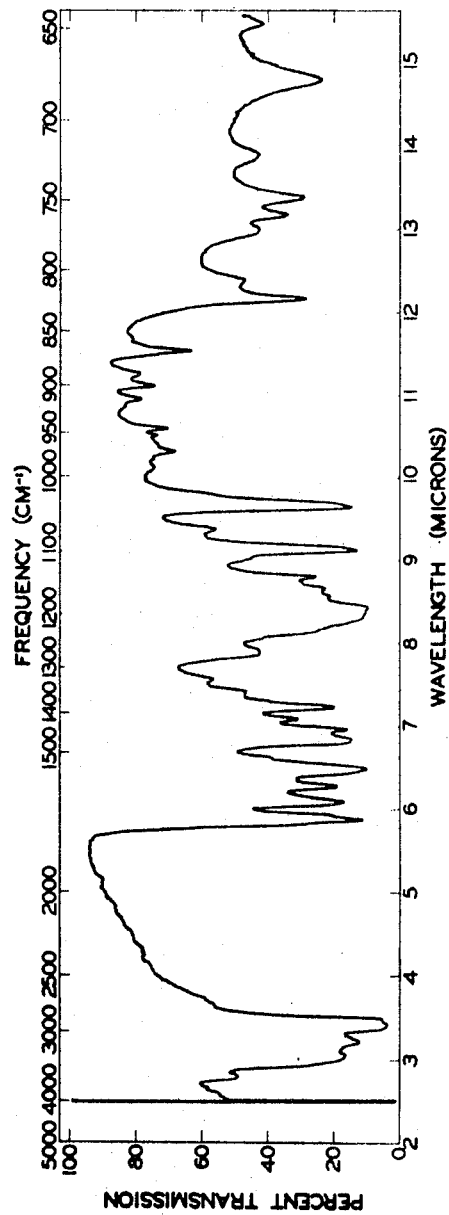

The infrared absorption spectrum of anthelvencin 2-naphthalenesulfonate in a mineral oil mull is shown in FIGURE 1. The distinguishable bands in the infrared absorption curve over the range of 2.0 to 15.0 microns are as follows: 2.79, 3.04, 3.20, 3.41 (mineral oil), 3.48 (mineral oil), 5.86, 5.91 (shoulder), 6.08, 6.26, 6.47, 6.60 (shoulder), 6.83 (mineral oil), 6.95, 7.07, 7.22 (largely mineral oil), 7.40, 7.55, 7.88, ca. 8.35 (broad), 8.55, 8.65, 8.79, 9.11, 9.36, 9.64, 10.10 (weak), 10.30, 10.49 (weak), 10.58, 10.95, 11.11, 11.25, 11.52, 12.16, 12.39, 12.98, 13.17, 13.38, 13.89, and 14.78 microns.

The specific rotation of anthelvencin 2-naphthalenesulfonate dried at room temperature in a vacuum desiccator over phosphorous pentoxide is +11.7° when determined at a temperature of 25° C. in 95 percent aqueous ethanol solution in which the concentration of the antibiotic salt is 1 percent on a weight per volume basis.

The ultraviolet absorption spectrum of an aqueous solution of anthelvencin 2-naphthalenesulfonate shows a maximum at 225 mμ with an absorptivity of $$E^{1\%}_{1\,cm.} = 2180$$

and another maximum at 285 mμ with an absorptivity of $$E^{1\%}_{1\,cm.} = 330$$

A powder X-ray diffraction pattern of this salt, using nickel-filtered copper radiation and a wave length value of 1.5405 A. for characterizing the interplanar spacings, gives values as follows:

| (d)    | $(I/I_1)$ |
|--------|-----------|
| 11.70  | .10       |
| 10.71  | .02       |
| 9.50   | .10       |
| 8.33   | .33       |
| 8.00   | .02       |
| 7.40   | .02       |
| 7.07   | .10       |
| 6.70   | .04       |
| 6.25   | .20       |
| 6.06   | .50       |
| 5.86   | .27       |
| 5.56   | .07       |
| 5.23   | .20       |
| 4.95   | .02       |
| 4.63   | 1.00      |
| 4.36   | .13       |
| 4.15   | .07       |
| 3.99   | .13       |
| 3.79   | .04       |
| 3.65   | .50       |
| 3.45   | .27       |
| 3.33   | .01       |
| 3.28   | .10       |
| 3.11   | .33       |
| 3.00   | .10       |
| 2.90   | .03       |
| 2.82   | .02       |
| 2.68   | .07       |
| 2.59   | .07       |
| 2.47   | .07       |
| 2.46   | .01       |
| 2.39   | .03       |
| 2.34   | .02       |
| 2.27   | .02       |
| 2.24   | .02       |
| 2.18   | .02       |
| 2.09   | .04       |
| 2.01   | .04       |
| 1.977  | .04       |
| 1.870  | .02       |
| 1.809  | .03       |
| 1.747  | .03       |
| 1.717  | .01       |
| 1.657  | .02       |
| 1.552  | .02       |

Anthelvencin 2-naphthalenesulfonate gives a positive result in the Ehrlich test and negative results in the ninhydrin test for α-amino acids and the Sakaguchi test for guanidino groups.

The salicylic acid salt of anthelvencin is a white crystalline solid melting at about 153–155° C. The solubility characteristics of this salt are similar to those of the 2-naphthalenesulfonate except for a slightly increased solubility in cold water.

Figure 2:
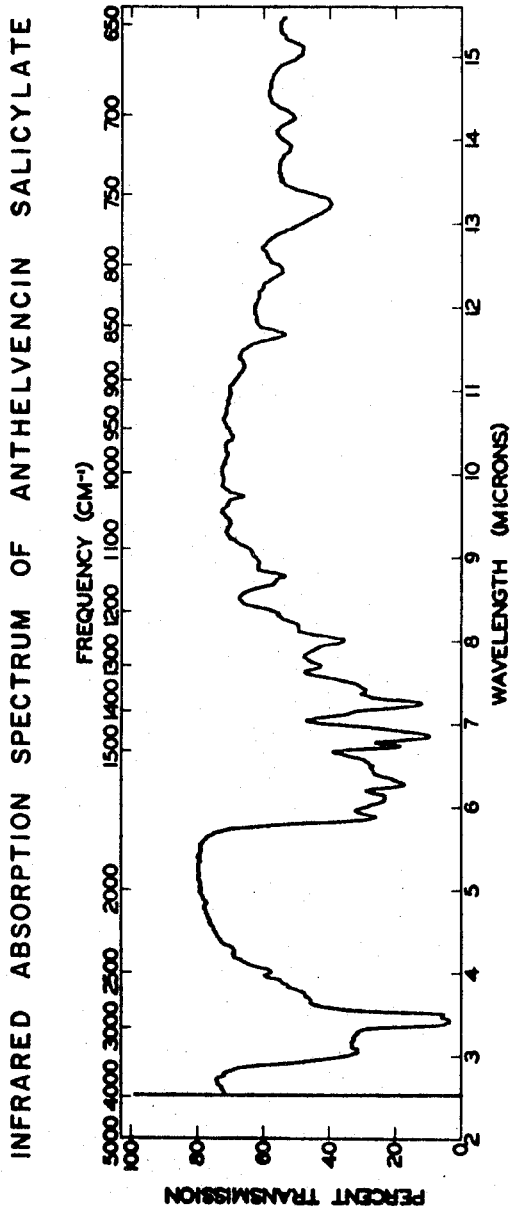

Electrometric titration of anthelvencin salicylate in 66 percent aqueous dimethylformamide indicates the presence of titratable groups having pK'a values of 9.75 and 11.98 and an apparent molecular weight of about 726. The infrared absorption spectrum of anthelvencin salicylate, shown in FIGURE 2, has distinguishable bands over the range of 2.0 to 15.0 microns as follows: 3.05, 3.42 (mineral oil), 3.48 (mineral oil), 3.65 (shoulder), 3.73 (shoulder), 4.00, 4.25 (weak), 5.88, 6.10, 6.26, ca. 6.50 (broad), 6.73, 6.85 (mineral oil), 7.24 7.40, 7.69, 8.00, 8.15 (shoulder), 8.31, 8.68 (shoulder), 8.76 8.92, 9.40 (weak), 9.72, 10.43 (weak), 11.27 (weak), 11.66, 12.44, 13.22, 13.90, 14.27, and ca. 15.10 microns.

An aqueous solution of anthelvencin salicylate, shows two maxima in its ultraviolet absorption spectrum, one at 230 m$\mu$ with an absorptivity of $$E^{1\%}_{1\,cm.} = 508$$

and the other at 295 m$\mu$ with an absorptivity of $$E^{1\%}_{1\,cm.} = 435$$

Elemental analyses of anthelvencin salicylate indicate that the salt has the following approximate percentage composition: C, 56.27%; H, 5.62%; N, 17.97%; O, 20.09%.

The empirical formula calculated for the salt is $C_{33}H_{40}N_9O_9$, again indicating a formula for the free base of anthelvencin of $C_{19}H_{28}N_9O_3$.

Anthelvencin salicylate has a specific rotation of $+7.9°$ as determined at 25° C. upon a 1 percent solution of the salt in 95 percent aqueous ethanol.

Other acids, both organic and inorganic, may be used to prepare addition salts of anthelvencin. Inorganic acids which may be employed include hydrochloric acid, sulfuric acid, phosphoric acid, and the like. As examples of organic acids which may be employed for salt formation may be mentioned citric acid, formic acid, acetic acid, tartaric acid, p-bromosalicylic acid, picric acid, m-nitrobenzoic acid, flavianic acid, p-nitrophthalic acid, p-(2-hydroxy-1-naphthylazo)benzenesulfonic acid (Orange II), and like acids. In general, the addition salts of anthelvencin with organic acids are preferably prepared from an inorganic acid salt, such as, for example, the hydrochloride.

The complete structural formula of anthelvencin has not yet been determined. However, hydrolytic degradation studies indicate that anthelvencin contains one or more pyrrole residues and a plurality of peptide linkages. The degradation studies show further that the anthelvencin molecule contains one or more units of $\beta$-alanine and either glutamic acid or a fragment which is converted to glutamic acid under the conditions of the degradation. As is frequently the case wtih peptide antibiotics, anthelvencin, as normally obtained from the fermenter, comprises at least two closely related compounds which will be referred to herein as anthelvencin A and anthelvencin B. The term anthelvencin, as employed herein, refers to the antibiotic as obtained from the fermentation.

The physical properties of anthelvencin A and anthelvencin B are very similar. The antibiotics are distinguished chiefly by their behavior in certain chromatographic systems. An especially useful method for distinguishing the antibiotics comprises the use of thin-layer chromatography over silica gel with a solvent system composed of 15 parts of n-butanol, 10 parts of pyridine, 1 part of glacial acetic acid, and 12 parts of water. In such a system, the $R_f$ value for anthelvencin A is found to be 0.5, while that for anthelvencin B is 0.3.

Anthelvencin has an inhibitory action against the growth of certain microbial organisms, including bacterial and fungal plant pathogens. Qualitatively, the microbiological activities of anthelvencin A and anthelvencin B are virtually identical. However, on an equal weight basis the microbiological potency of anthelvencin A naphthalenesulfonate is found to be about twice as great as that of the corresponding salt of anthelvencin B. The levels of anthelvencin which show inhibition against the growth of illustrative organisms are numerically set forth in Table I. The inhibitory levels were determined by the agar-dilution test, or by the broth-dilution test. The inhibitory concentrations for the bacterial and fungal plant pathogens were determined over a period of 72 hours.

In the agar-dilution test, the test organism is streaked or implanted on a series of agar plates containing various concentrations of anthelvencin in the agar to determine the minimum concentration of the antibiotic in mcg./ml. (micrograms per milliliter) which inhibits the growth of the organism over a period of 48 hours.

In the broth-dilution test, a series of tubes containing nutrient broth having various concentrations of anthelvencin are inoculated with the test organism to determine the minimum concentration of anthelvencin in mcg./ml. in the broth substrate which inhibits organism growth over a period of about 24 hours.

TABLE I

| Test organism: | Minimum inhibitory conc., mcg./ml., 24 hr. |
|---|---|
| Staphylococcus aureus | 25 |
| Staphylococcus albus | 50 |
| Bacillus subtilis | 12.5 |
| Sarcina lutea | 1.56 |
| Myco. tuerculosis (607) | 50 |
| Myco. avium | 25 |
| Escherichia coli | 12.5 |
| Proteus vulgaris | 25 |
| Aerobacter aerogenes | 100 |
| Klebsiella pneumoniae | 25 |
| Salmonella enteritidis | 50 |
| Shigella paradysenteriae | 50 |
| Vibrio metschnikovii | 50 |
| Saccharomyces pastorianus | 6.25 |
| Candida albicans | 100 |
| Trichophyton rubrum | a 3.13 |
| Trichophyton interdigitale | a 3.13 |
| Agrobacterium tumefaciens | 12.5 |
| Corynebacterium michiganense | 1.56 |
| Erwinia amylovora | 6.25 |
| Pseudomonas solanacearum | 6.25 |
| Xanthomonas phaseoli | 12.5 |
| Alternaria solani | 6.25 |
| Botrytis cinerea | 6.25 |
| Ceratostomella ulmi | 25 |
| Colletotrichum pisi | 12.5 |
| Endoconidiophora fagacearum | 50 |
| Fusarium moniliforme | 50 |
| Glomerella cingulata | 25 |
| Helminthosporium sativum | 12.5 |
| Penicillium expansum | 50 |
| Phoma pigmentovora | 100 |
| Polyporus ostreatus | 3.13 |
| Pullularia sp. | 100 |
| Verticillium albo-atrum | 50 | a Determined over 48 hours.

Identical values are obtained with the salicylate salt of anthelvencin. It is apparent from these data that anthelvencin in the form of its acid addition salts is useful in suppressing the growth of a variety of pathogenic organisms.

The acid addition salts of anthelvencin are also useful for the control of helminths and various other types of parasitic organisms. Thus, for example, activity has been demonstrated against both species of mouse pinworm, Syphacia obvelata and Aspiculuris tetraptera, and against the swine helminths, Ascaris suum, Oesophagostumum spp. and Trichuris suis. When included in the daily feed ration of swine for at least 35 days, anthelvencin salts at a level as low as 12 g. per ton of feed are effective in reducing the worm burden of the animals. Combinations of anthelvencin with other substances having anthelmintic activity, such as for example, piperazine, hygromycin B, and the like, can also be employed. Other organisms which are controlled by anthelvencin include Escherichia coli, Proteus vulgaris, Entamoeba histolytica, and the like.

The acute toxicity of anthelvencin salicylate has been determined in mice. Orally, the $LD_{50}$ of this salt is greater than 500 mg./kg. The $LD_{50}$ of anthelvencin salicylate is about 175 mg./kg. when the drug is administered by intraperitoneal injection.

Anthelvencin can be produced by culturing hitherto unknown strains of *Streptomyces venezuelae* under aerobic conditions in a culture medium containing assimilable sources of carbon, nitrogen and inorganic salts. The organisms were first isolated from soil samples. Portions of the soil samples were suspended in sterile distilled water and the suspenion were streaked on nutrient agar plates. The seeded nutrient agar plates were incubated at about 25–35° C. for several days. At the end of the incubation time, colonies of the anthelvencin-producing organisms were transferred by means of a sterile platinum loop to agar slants. The inoculated agar slants were incubated to provide larger amounts of inoculum for the production of anthelvencin.

The novel organisms capable of producing anthelvencin have been placed on permanent deposit with the American Type Culture Collection at Washington, D.C., and are available to the public under the ATCC accession numbers 14583, 14584, and 14585.

Because of the uncertainty of taxonomic studies with the Streptomcyes group of organisms, there is always an element of doubt associated with the classification of a newly discovered organism. However, the organisms which produces anthelvencin appear to resemble most nearly in the most important characteristics the published descriptions of the organisms *S. cinnamonensis, S. roseoflavus,* and *S. venezuelae* (NRRL 902), all of which resemble certain strains of *S. lavendulae* with straight spore chains. Despite some similarities, however, sufficient differences exist to distinguish the novel organisms employed in this invention from all previously described organisms. The presently employed organisms are believed to be closer to the above *S. venezuelae* (NRRL 902) in characteristics than to any other heretofore described organisms. However, there are many dissimilarities between the present cultures and *S. venezuelae* (NRRL 902). The present novel organisms, therefore, are designated as new strains of *S. venezuelae.*

The detailed description contained herein will be made with particular reference to the newly found organisms ATCC 14583, 14584, and 14585. However, it is to be understood that the production of anthelvencin by the growing of mutants of these anthelvencin-producing organisms is within the scope of this invention. Such other mutants can be produced by known procedures, as by subjecting one of the above strains to X-ray or ultraviolent radiation or to chemical agents, such as for example, nitrogen mustards.

The methods employed in the taxonomic studies of the anthelvencin-producing strains of *S. venezuelae*, ATCC 14583, 14584, and 14585 are those commonly used in the taxonomy of antinomycetes. Carbon utilization tests were carried out according to the method described by Pridham and Gottlieb, *J. Bact.*, 56, 107 (1948). The data obtained from the taxonomic studies are shown in tabular form below. The numbers in parentheses refer to color blocks in Maerz and Paul, Dictionary of Color, (1950). Cultures were grown at 30° C. Morphological, physiological, and cultural characteristics were determined after 14 days' incubation. Carbon utilization was observed after 10 days' incubation.

TABLE II.—DESCRIPTIONS OF CULTURES ATCC 14583, 14584, 14585

| Property compared | ATCC 14583 | ATCC 14584 | ATCC 14585 |
|---|---|---|---|
| Morphology | Spore chains straight or flexuous; spores 0.7–1.0μ by 1.0–1.8μ, oval to cylindrical. | Spore chains straight or flexuous; spores 0.7–1.0μ by 1.0–1.8μ, oval to cylindrical. | Spore chains straight or flexuous; spores 0.7–1.0μ by 1.2–1.8μ, cylindrical. |
| Colony characteristics on: | | | |
| Tomato paste-oatmeal | Growth abundant; aerial mycelium abundant, pink-gray (43–1B); reverse red-brown (16–11A); no soluble pigment. | Growth abundant; aerial mycelium abundant, light gray (35–A1); reverse brown (15–E7); no soluble pigment. | Growth abundant; aerial mycelium abundant, pink-gray (51–2A); reverse dark red-brown (8–9H); soluble pigment dark red-brown. |
| Nutrient agar | Growth fair; no aerial mycelium; reverse yellow (10–1E); no soluble pigment. | Growth fair; no aerial mycelium; reverse yellow (11–L7); no soluble pigment. | Growth fair; no aerial mycelium; reverse yellow (10–3H); no soluble pigment. |
| Yeast | Growth abundant; aerial mycelium abundant, light gray (20–1A); reverse light red-brown; no pigment. | Growth moderate; aerial mycelium moderate, white to light brown (4–A8); reverse brown (14–J8); no soluble pigment. | Growth abundant, aerial mycelium sparse, white (1–1B); reverse red-brown; no soluble pigment. |
| Salts—starch agar | Growth abundant; aerial mycelium, gray-white (12–1A); reverse brown (14–11G); no soluble pigment. | Growth abundant; aerial mycelium abundant, white to light brown (10–A2); reverse brown (14–A5); no soluble pigment. | Growth abundant; aerial mycelium abundant, light orange-yellow (9–2A); reverse brown (8–10J); very light brown soluble pigment. |
| Czapek's agar | Growth moderate; aerial mycelium moderate, near white (2–7A); reverse yellow (11–4J); no soluble pigment. | Growth moderate; aerial mycelium moderate, white to light brown (3–B7, 3A8); reverse red-brown (7–H9); slight red soluble pigment. | Growth moderate; aerial mycelium moderate, white; reverse red-brown (5–9G); no soluble pigment. |
| Action on milk | Coagulation, peptonization. | Abundant brownish yellow surface growth, coagulation, partial peptonization. | Coagulation, peptonization. |
| Nutrient gelatin | Complete liquefaction after 19 days. | 50 percent liquefaction after 19 days. | Complete liquefaction after 19 days. |
| Nitrate reduction | + | + | + |
| $H_2S$ production | − | − | − |

In Table III are set forth the results of the carbon utilization tests carried out on organisms ATCC 14583, 14584, and 14585. In the table, the following symbols are employed:

+ = Growth and utilization.
− = No apparent growth or utilization.

TABLE III.—CARBON UTILIZATION PATTERN FOR ANTHELVENCIN-PRODUCING-ORGANISMS

| | Growth response | | |
|---|---|---|---|
| Substrate | ATCC 14583 | ATCC 14584 | ATCC 14585 |
| L (+)-Arabinose | + | + | + |
| L (+)-Rhamnose | − | − | − |
| D-Ribose | + | + | + |
| D (+)-Xylose | + | + | − |
| Dextrose | + | + | + |
| D (−)-Fructose | + | + | + |
| Mannose | + | + | + |
| Lactose | − | − | − |
| Maltose | + | − | + |
| Sucrose | − | − | − |
| D (+)-Trehalose | + | + | + |
| Inulin | − | − | − |
| D (+)-Raffinose | + | + | + |
| i-Inositol | + | − | + |
| Mannitol | + | + | + |
| Sorbitol | − | − | − |
| Cellulose | − | − | − |
| Salicin | + | + | + |

The culture medium employable in producing anthelvencin by cultivation of the above-described organisms can be any one of several media since, as is apparent from the above-described utilization tests, the organism is capable of utilizing different energy sources. However, for economy of production, maximum yield of antibiotic, and ease of isolation of the antibiotic, certain culture media containing relatively simple nutrient sources are preferable. For example, the media which are useful in the production of anthelvencin include an assimilable source of carbon such as glucose, fructose, maltose, mannose, soluble starch, molasses, dextrin, brown sugar, corn steep solids, and the like. A preferred source of carbon is glucose. Additionally, employable media include a source of assimilable nitrogen such as oatmeal, beef extract, peptones (meat or soy), hydrolyzed casein, yeast, amino acid mixtures, and the like. Presently preferred sources of nitrogen are peptones, hydrolyzed casein, and beef extracts.

Mineral salts, for example those providing calcium, magnesium, sodium, potassium, chloride, sulfate, and carbonate ions, and a source of growth factors, such as yeast or yeast extract, can be incorporated in the media with beneficial results.

As with many microorganisms, it is believed to be desirable to include the so-called "trace elements" in the culture medium for growing the actinomycetes employed in this invention. Such trace elements are commonly supplied as impurities incidental to the addition of the other constituents of the medium.

The initial pH of the culture medium can be varied widely. However, it has been found desirable that the initial pH of the medium be between about 6.0 and about 7.5, and preferably about 6.5 to about 7.3. As has been observed with other actinomycetes, the pH of the medium gradually increases throughout the growth period of the organism while anthelvencin is being produced, and may attain a level from about 7.0 to about 8.0 or above, the final pH being dependent at least in part on the initial pH of the medium, the buffers present in the medium, and the period of time the organism is permitted to grow.

Submerged, aerobic cultural conditions are the conditions of choice for the production of anthelvencin. For preparation of relatively small amounts, shake flasks and surface culture in bottles can be employed; but for the preparation of large amounts, submerged aerobic culture in sterile tanks is preferred. The medium in the sterile tank can be inoculated with a sporulated suspension; but because of the growth lag experienred when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism; and when a young, active vegetative inoculum has been obtained, to transfer the vegetative inoculum aseptically to the large tank. The medium in which the vegetative inoculum is produced can be either the same as or different from the medium utilized for the large-scale production of anthelvencin.

The organisms grow best at temperatures in the range of about 26° C. to about 33° C. Optimal anthelvencin production appears to occur at temperatures of about 26-30° C.

As is customary in aerobic submerged culture processes, sterile air is blown through the culture medium. For efficient growth of the organism and anthelvencin production, the volume of air employed in the tank production of anthelvencin preferably is upwards of 0.1 volume of air per minute per volume of culture medium. Efficient growth and optimal yields of anthelvencin are obtained when the volume of air used is at least one volume of air per minute per volume of culture medium.

The concentration of anthelvencin activity in the culture medium can be followed readily during the fermentation period by testing samples of the culture medium for their inhibitory activity against the growth of an organism known to be inhibited in the presence of anthelvencin. The use of the organism *Bacillus subtilis* has been found to be suitable for this purpose. The testing can be carried out by well-known turbidimetric or cup-plate methods.

In general, maximum production of the antibiotic occurs within about 4 to 7 days after inoculation of the culture medium when submerged aerobic culture or shake flask culture is employed and within about 5 to 10 days when surface culture is carried out.

The mycelium and undissolved solids are removed from the fermentation broth by conventional means such as filtration or centrifugation, usually after adjustment of the pH to a level of about pH 3.5. The antibiotic activity is contained in the filtered broth and can be removed therefrom by employing the usual adsorption techniques. A variety of adsorbents can be employed, but ion-exchange resins of an acidic character are generally preferred. An especially preferred resin is IRC-50, a weakly cationic carboxylic acid resin sold by the Rohm and Haas Company.

In employing the column adsorption technique, anthelvencin can be recovered by passing the broth filtrate over a column packed with a suitable ion-exchange resin, for example IRC-50. Customarily, if one part of resin is employed per 30 to 35 parts of broth filtrate, substantially complete removal of anthelvencin from the broth is effected when the flow rate through a column having a 3-inch diameter is maintained at about 5 to 10 milliliters per minute. The column is then washed thoroughly with water until the effluent is colorless, and the antibiotic activity is eluted from the column by employing a solvent mixture comprising a dilute aqueous acid and a water-miscible organic solvent. Thus, for example, a solvent mixture comprising 80 parts by volumn of 0.5 N hydrochloric acid and 20 parts by volume of acetone has been found highly effective for eluting the anthelvencin activity.

In order to effect the removal of some associated impurities, the pH of the eluate is adjusted to about pH 5.5 with base, the eluate is concentrated to about three-quarters of its original volume, about three volumes of acetone are added with stirring to the concentrated eluate, and the pH of the resulting mixture is readjusted to about pH 8.5. The mixture is then passed through a column packed with 60-100 mesh Florisil (a magnesium silicate adsorbent sold by the Floridin Company) in order to remove pigment and tars. The column is washed with 75 percent aqueous acetone until the effluent is negative to Ehrlich's reagent, and the original effluent and wash are combined and concentrated. Sodium chloride is added to the concentrate in the proportion of about 250 g. of sodium chloride per liter of concentrate. The dark oily residue which separates is removed, the mixture is filtered, and the clear filtrate is extracted with benzyl alcohol. Water is removed from the benzyl alcohol extracts in vacuo and the resulting dry benzyl alcohol solution is added slowly to about nine volumes of acetone. Chilling of the resultant mixture brings about the precipitation of the hydrochloride of anthelvencin. The product so obtained consists primarily of the hydrochloride of anthelvencin A, with a smaller amount of anthelvencin B hydrochloride.

Anthelvencin A free of anthelvencin B can be prepared in the form of one of its acid addition salts by further treatment of the preparation obtained as hereinabove desired. Thus, for example, the mixture of anthelvencin hydrochlorides can be dissolved in a solvent system comprising n-butanol, pyridine, acetic acid, and water and the solution so obtained passed through a column packed with pretreated cellulose powder. The cellulose powder is suspended in water to make a slurry, and is then subjected to filtration and successive resuspension in 0.2 N aqueous hydrochloric acid, water, and a solvent system comprising n-butanol, pyridine, acetic acid, and water in the ratio of 15:10:1:12. The eluate flowing from the column is collected at regular intervals and the progress of the chromatographic fractionation is monitored by examining the fractions with the aid of thin-layer chromatography. The first fractions collected contain only anthelvencin A hydrochloride. These are followed by intermediate fractions containing the salts of both factors. Pure anthelvencin B hydrochloride occurs in the final fractions collected. The fractions containing the single individual factors are pooled and concentrated to dryness to obtain a pure preparation of the hydrochloride of anthelvencin A or B, as the case may be.

Salt other than the hydrochloride can be employed to separate the mixture of anthelvencin A and B into its individual components. Thus for example, the mixture of hydrochlorides can be converted to a mixture containing the naphthalenesulfonate or salicylate salts, which may then be subjected to a similar chromatographic fractionation in order to isolate the corresponding salt of anthelvencin A free of the salt of anthelvencin B.

Example 1.—Preparation of anthelvencin

A culture of *Streptomyces venezuelae* ATCC 14584 is produced by growing the organism on a nutrient agar slant. The nutrient agar is prepared from 65 g. of oatmeal cooked as a slurry, strained, and mixed with 20 g. of agar and sufficient water to make the total volume one liter. The slant is inoculated with spores of *S. venezuelae* ATCC 14584 and is incubated for five days at 30° C. The culture growth on the slant is covered with about 6 ml. of distilled water, and the slant is scraped gently to remove the organisms and to provide an aqueous suspension thereof.

One milliliter of the suspension so obtained is used to inoculate under aseptic conditions a 100-ml. portion of a sterile vegetative culture medium having the following composition:

| | G. |
|---|---|
| Cerelose | 15 |
| Soybean meal | 15 |
| Corn steep solids | 5 |
| Sodium chloride | 5 |
| Calcium carbonate | 2 |
| Water, sufficient to make a final volume of 1 l. | |

The inoculated vegetative medium is incubated at about 30° C. for 48 hours, during which time the flasks are shaken at the rate of 108 cycles per minute on a reciprocal shaker having a 2-inch stroke.

Five milliliters of the vegetative inoculum are used to inoculate aseptically 100-ml. portions of a production medium contained in 500-ml. Erlenmeyer flasks, the medium having been sterilized at 120° C. for 30 minutes and having the following composition:

| | | |
|---|---|---|
| Soybean meal | g__ | 15 |
| Casein | g__ | 1 |
| Sodium nitrate | g__ | 3 |
| Crude glucose syrup | ml__ | 20 |
| Calcium carbonate | g__ | 2.5 |
| Water, sufficient to make a final volume of 1 l. | | |

The inoculated culture is incubated for five days at about 30° C. with agitation on a reciprocal shaker as described above. The pH of the starting medium is about pH 6.9. At the end of the incubation period, the pH of the medium has increased to about pH 7.3.

The culture broth so obtained is filtered to remove the mycelium and undissolved solids. The filtered broth contains the anthelvencin which is produced by the organisms.

Example 2.—Preparation of anthelvencin hydrochloride

A culture of *Streptomyces venezuelae* ATCC 14584 is produced as described in Example 1 using a nutrient medium comprising 20 g. of starch, 3 g. of beef extract, 1 g. of asparagine, 20 g. of agar, and water sufficient to make a total volume of one liter. The slant cultures are grown for five to seven days at a temperature of about 30° C.

The growth on the slant is then harvested as described in Example 1, and 1 ml. of the suspension so obtained is employed to inoculate aseptically a 500-ml. Erlenmeyer flask containing 100 ml. of a sterilized vegetative culture medium having the following compositions:

| | G. |
|---|---|
| Dextrose, technical | 15 |
| Soybean oil meal, solvent extracted | 15 |
| Corn steep liquor | 10 |
| Sodium chloride | 5 |
| Calcium carbonate | 2 |
| Water, sufficient to make a final volume of 1 l. | |

The inoculated medium is incubated for 24 hours at 30° C. with shaking at 250 cycles per minute on a rotary shaker having a 2-inch stroke. About 25 ml. of the resulting vegetative culture is then transferred by means of a sterile pipette to a 4-liter modified Erlenmeyer flask containing one liter of a medium having the same composition. Incubation is carried out for 48 hours under the conditions just described. The entire contents of the flask containing the vegetative culture are transferred to a fully baffled 45-liter stainless steel fermentor equipped with two 6-bladed impellers five inches in diameter and containing 28 liters of a production medium having a composition as follows:

| | | |
|---|---|---|
| Dextrose, technical | g__ | 30 |
| Soybean oil meal, solvent extracted | g__ | 20 |
| Sodium nitrate | g__ | 3 |
| Calcium carbonate | g__ | 5 |
| Cottonseed oil | ml__ | 2 |
| Casein | g__ | 2 |
| Water, sufficient to make 1 l. | | |

The fermentation is carried out at 30° C. for four days with stirring at a rate of 400–450 r.p.m. Foaming is controlled by the addition, when necessary, of soybean oil. Throughout the fermentation, the medium is aerated by the addition of sterile air at the rate of about 30 liters per minute. At the end of the fermentation period, the whole broth is adjusted to about pH 3.5 with 5 N sulfuric acid and about 3 percent (weight/volume) of a commercial filter aid is added. After filtration, about 22 liters of filtered broth are obtained.

The combined broths from four tank fermentations are passed over a packed column, three inches in diameter, containing about 2650 ml. of wet IRC–50 resin in the acid cycle. When the flow rate is adjusted to about 6 ml. per minute, the effluent coming from the column has no biological activity, indicating that adsorption of the antibiotic on the resin is substantially complete. When all of the filtered broth, comprising about 88 liters, has passed through the column, the column is washed repeatedly with water until the effluent is colorless.

Anthelvencin is recovered from the column as follows: The column is eluted continuously with a mixture comprising 30 percent (volume/volume) of acetone and 70 percent of 0.5 N aqueous hydrochloric acid so long as the effluent continues to give a positive test to Ehrlich's reagent. A total of about 10.4 liters of eluate is collected. The eluate is adjusted to about pH 5.5 with 10 percent aqueous sodium hydroxide solution and is concentrated to a volume of about 8.5 liters. Three volumes of acetone are added with stirring to the concentrated eluate, and the pH of the resulting mixture is further adjusted upward to about pH 8.5. The mixture is passed through a column containing about 1750 ml. of wet 60–100 mesh Florisil to remove pigments and tars. The column is then washed with 75 percent aqueous acetone until the effluent is negative to Ehrlich's reagent. The original effluent and wash are combined and concentrated to a volume of about 9 liters, and 2250 g. of sodium chloride are added thereto. The dark tarry residue which forms is removed by filtration, and the resulting filtrate is extracted three times with 90-ml. portions of benzyl alcohol. Residual water is removed from the combined extracts under vacuum, and the resulting benzyl alcohol solution is added slowly with rapid agitation to nine volumes of acetone. After storage overnight at about 3° C., the precipitated solid is recovered by filtration, washed thoroughly with acetone, and dried in vacuo. The anthelvencin hydrochloride so obtained can then be employed for further purification or for conversion to another salt of anthelvencin as described in subsequent examples.

Example 3.—Preparation of anthelvencin 2-naphthalenesulfonate

To a solution of 1 g. of anthelvencin hydrochloride, prepared as in Example 2, are added 40 ml. of a 5 percent aqueous solution of sodium 2-naphthalenesulfonate. The mixture is warmed to effect complete solution and is then permitted to cool slowly. A dark oil which begins to separate when the temperature of the solution reaches about 20° C. is removed by centrifugation, and the supernatant solution is chilled to effect crystallization of anthelvencin 2-naphthalenesulfonate.

Example 4.—Preparation of anthelvencin salicylate

To 30 ml. of a 5 percent aqueous solution of sodium salicylate is added 1 g. of anthelvencin hydrochloride, prepared as described in Example 2. The mixture is heated for about 10 minutes on a steam bath and is filtered while still hot in order to remove undissolved solids. The clear filtrate is allowed to cool to room temperature and crystallization is induced by scratching the sides of the flask with a glass rod. At the first sign of crystallization, the mixture is refrigerated at about 3° C. to permit complete crystallization to take place. The crystals of anthelvencin salicylate are collected by filtration, washed twice on the filter with 10-ml. portions of ice water, and dried in vacuo over phosphorus pentoxide at room temperature. Recrystallization is effected from a 2 percent aqueous sodium salicylate solution.

Example 5.—Preparation of anthelvencin A free of anthelvencin B

A chromatographic column 1¼ inches in diameter and 17 inches long is packed with specially treated cellulose prepared as follows: A suspension of 100 g. of Whatman cellulose powder (CM 70) is prepared and stirred well for about 30 minutes. The cellulose is recovered by filtration and is then successively resuspended in 0.2 N hydrochloric acid, water, and a solvent mixture of n-butanol, pyridine, acetic acid, and water in the ratio 15:10:1:12.

A solution of 5 g. of anthelvencin hydrochloride, prepared as described in Example 2, in 40 ml. of the solvent system described above is passed through the column. The column is equipped with an automatic fraction collector adjusted to 30-minute intervals, and the flow rate from the column is controlled so as to deliver about 5 to 7 ml. of effluent during this time interval. The progress of chromatographic fractionation is monitored by examining the effluent in every fifth tube by means of thin-layer chromatography on silica gel. The two components are readily distinguished on chromatographic plates by virtue of the fact that the salts of anthelvencin A move much more rapidly in this system than the corresponding derivatives of anthelvencin B, the $R_f$ values in this system being 0.5 and 0.3 respectively. The fractions which are determined by this technique to contain only anthelvencin A are pooled and concentrated to dryness. The solid anthelvencin A hydrochloride so obtained can be further purified or can be converted to other salts of anthelvencin A by the technique described in Examples 4 and 5.

Fractions containing only anthelvencin B are pooled and handled in the same way. The intermediate fractions, containing both anthelvencin A and anthelvencin B, can be subjected to further chromatography to effect further resolution resulting in the isolation of additional quantities of the pure individual components.

We claim:
1. A method of producing anthelvencin which comprises cultivating an organism selected from the group consisting of Streptomyces venezuelae ATCC 14583, Streptomyces venezuelae ATCC 14584, and Streptomyces venezuelae ATCC 14585 in a culture medium containing assimilable sources of carbon, nitrogen, and inorganic salts, under submerged aerobic conditions until a substantial amount of anthelvencin is produced by said organism in said culture medium.

2. A method according to claim 1 in which the organism is Streptomyces venezuelae ATCC 14583.

3. A method according to claim 1 in which the organism is Streptomyces venezuelae ATCC 14584.

4. A method according to claim 1 in which the organism is Streptomyces venezuelae ATCC 14585.

5. A method according to claim 1 in which the culture medium is maintained at a temperature of about 26–33° C. and the growth of the organism is carried out for a period of about four to ten days.

6. A method of producing anthelvencin which comprieses cultivating an organism selected from the group consisting of Streptomyces venezuelae ATCC 14583, Streptomyces venezuelae ATCC 14584, and Streptomyces venezuelae ATCC 14585 in a cuture medium containing assimilable sources of carbon, nitrogen, and inorganic salts, under submerged aerobic conditions until a substantial amount of anthelvencin is produced by said organism in said cuture medium, and recovering the anthelvencin from said culture medium.

7. A method for obtaining anthelvencin A and anthelvencin B as separate substances, which comprises cultivating an organism selected from the group consisting of Streptomyces venezuelae ATCC 14583, Sterptomyces venezuelae ATCC 14584, and Streptomyces venezuelae ATCC 14585 in a culture medium containing assimilable sources of carbon, nitrogen, and inorganic salts, under submerged aerobic conditions until a substantial amount of anthelvencin is produced by said organism in said culture medium, recovering the anthelvencin from said culture medium, and subjecting the anthelvencin, in the form of an acid addition salt to fractional chromatography whereby the salts of anthelvencin A and anthelvencin B are obtained as separate substances from the fractions collected from the chromatographic column.

8. A compound of the group consisting of the antibiotic anthelvencin and its acid addition slats, said antibiotic in the form of its 2-naphthalenesulfonate addition salt being characterized as a white crystalline solid melting at about 181–183° C. which is soluble in hot water, methanol, benzyl alcohol, dimethylformamide, dimethyl sulfoxide, phenol, and methyl Cellosolve, is slightly soluble in ethanol, and is relatively insoluble in cold water, isopropanol, acetone, ethyl acetate, ether, chloroform, and benzene; which is basic, having pK'a values of 9.58 and 11.95 as determined by electrometric titration in 66 percent aqueous dimethylformamide; which has an apparent molecular weight as calculated from the titration data of about 847; which has the approximate composition of 54.78 percent carbon, 5.23 percent hyldrogen, 14.66 percent nitrogen, 7.41 percent sulfur, and 17.38 percent oxygen; which, when mulled in mineral oil, has the following distinguishable bands in its infrared absorption spectrum over the range of 2.0 to 15.0 microns: 2.79, 3.04, 3.20, 3.41, 3.48, 5.86, 5.91 (shoulder), 6.08, 6.26, 6.47 6.60 (shoulder), 6.83, 6.95, 7.07, 7.22, 7.40, 7.55, 7.88, 8.35 (broad), 8.55, 8.65, 8.79, 9.11, 9.36, 9.64, 10.10 (weak), 10.30, 10.49 (weak), 10.58, 10.95, 11.11, 11.25, 11.52, 12.16, 12.39, 12.98, 13.17, 13.38, 13.89, and 14.78 microns; a vacuum dried sample of which has a specific rotation of +11.7° determined at 25° C. in 95 percent aqueous ethanol in which the concentration of the antibiotic salt is 1 percent on a weight per volume basis; which gives a positive result in the Ehrlich test and negative results in the ninhydrin test for α-amino acids and the Sakaguchi test for guanidine groups; and which has an ultraviolet absorption spectrum in aqueous solution showing absorption maxima at about 225 mμ and 285 mμ with absorptivity values of $$E_{1\ cm.}^{1\%} = 2180 \text{ and } 330$$

respectively.

9. The method of treating helminthiasis which comprises administering to a parasitized host a therapeutically effective amount of a compound selected from the group consisting of anthelvencin as defined in claim 8 and the acid addition salts thereof with physiologically acceptable acids.

References Cited

UNITED STATES PATENTS 3,089,816  5/1963  Gaeumann et al. _ _ _ _ _ _ 195—80

ALBERT T. MEYERS, Primary Examiner

DAREN M. STEPHENS, Assistant Examiner